Aug. 2, 1966 E. LEIBER 3,263,497
FORCE DIRECTING AND MEASURING ARRANGEMENT
Filed March 14, 1963 4 Sheets-Sheet 1
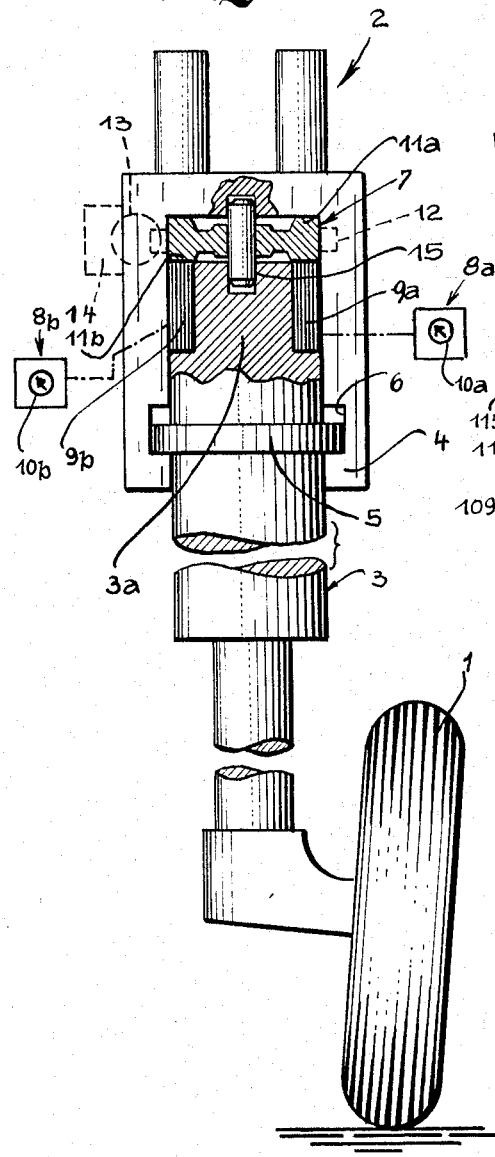
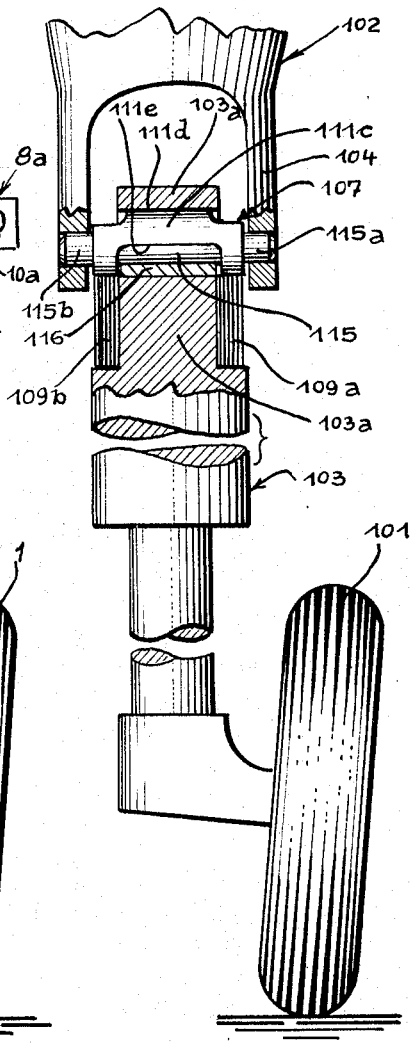
INVENTOR
*Egwin Leiber*
BY *Michael S. Striker*
ATTORNEY

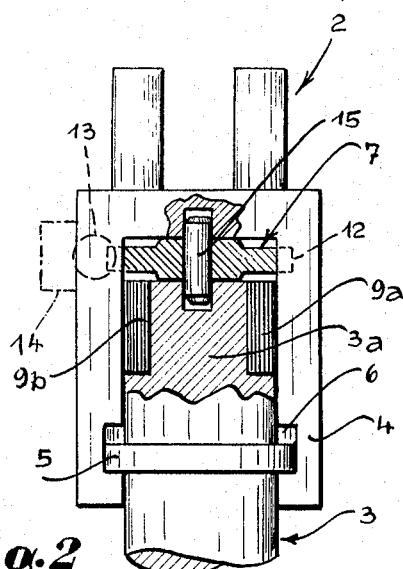
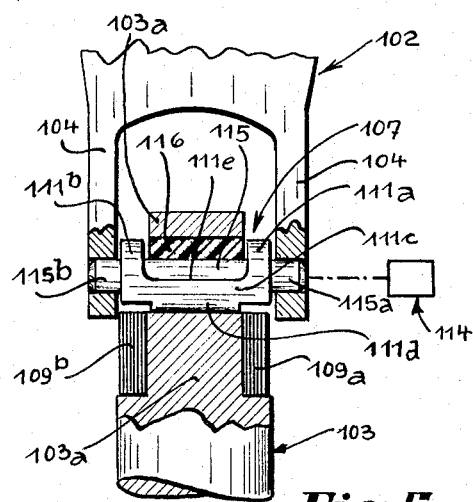
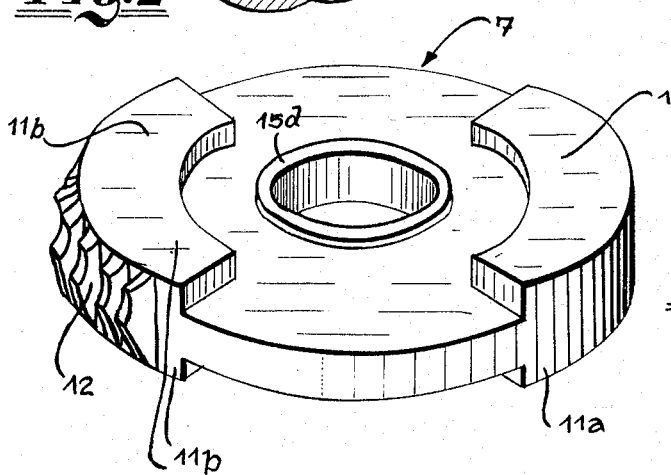
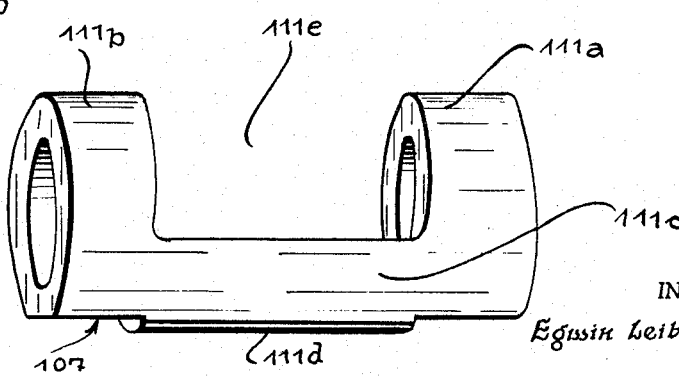

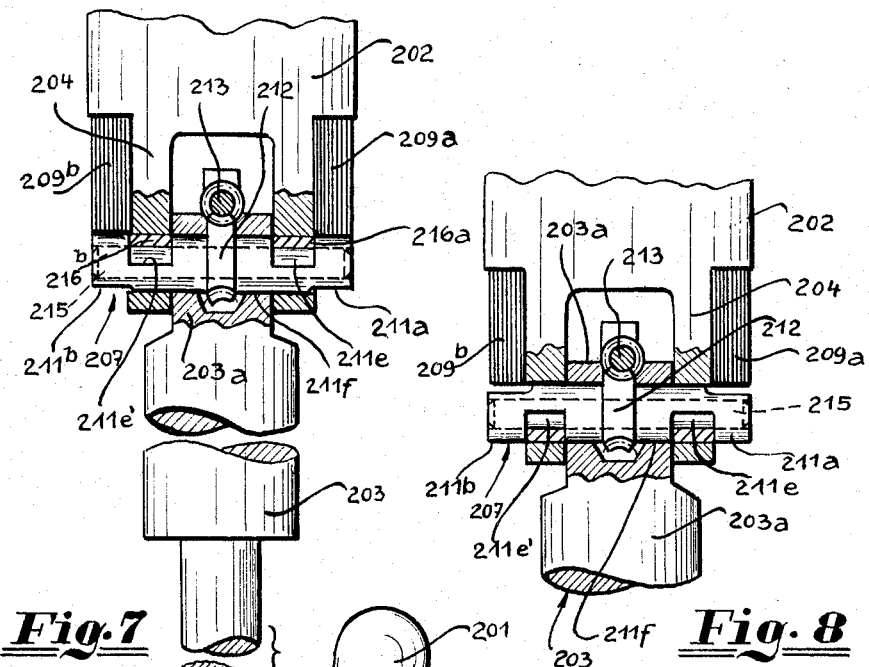
*Fig.7*  *Fig.8*
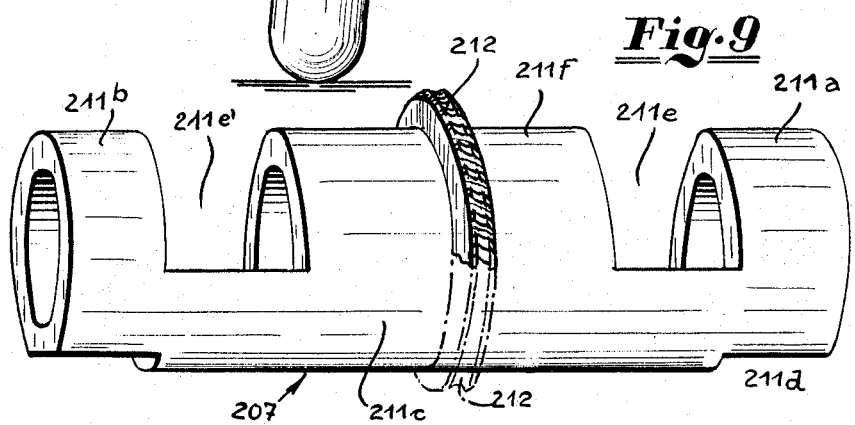
*Fig.9*
INVENTOR.
*Egwin Leiber*
BY *Michael S. Striker*
ATTORNEY

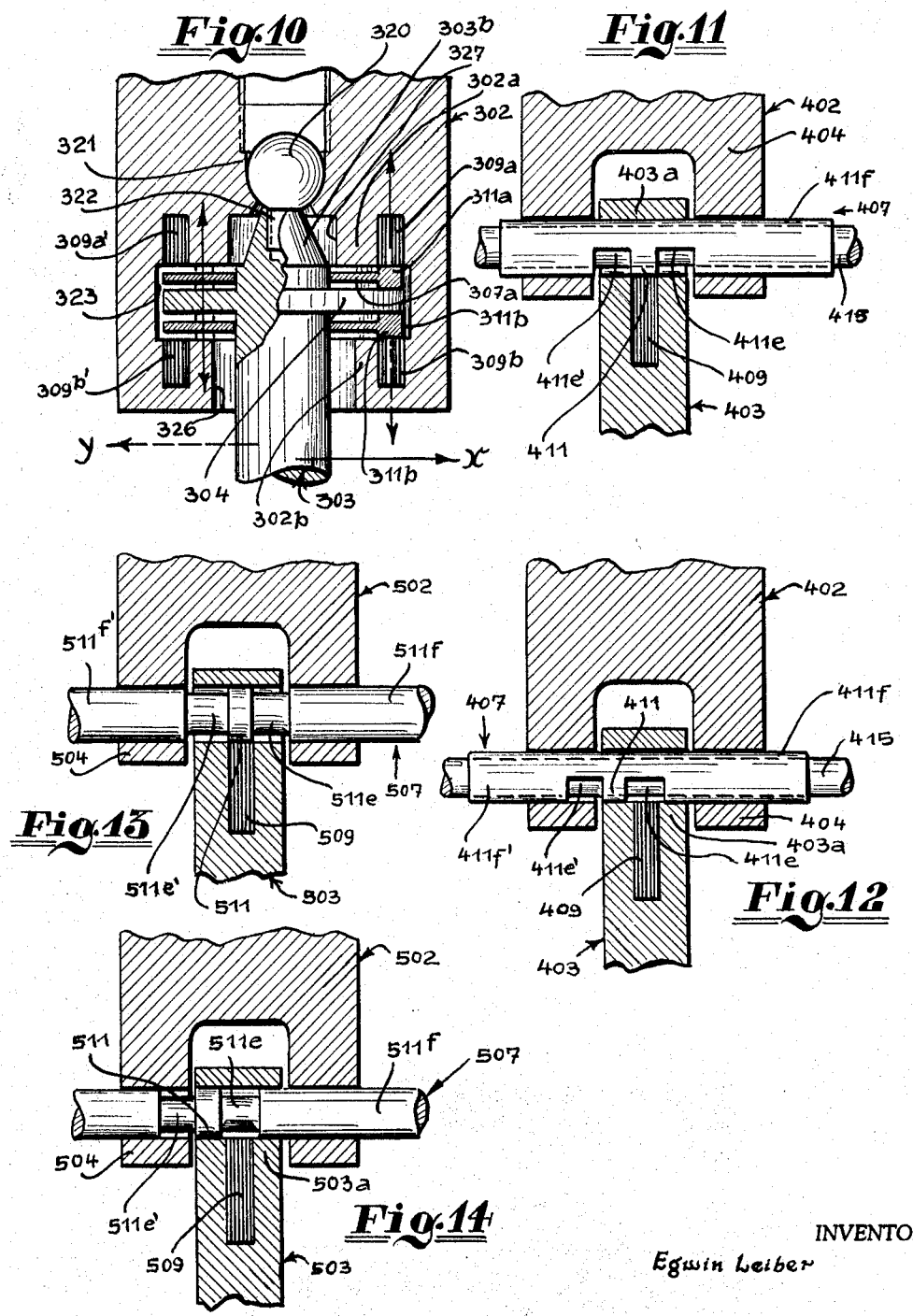

United States Patent Office 3,263,497
Patented August 2, 1966

3,263,497
FORCE DIRECTING AND MEASURING
ARRANGEMENT
Egwin Leiber, Kolner Strasse 42,
Frankfurt am Main, Germany
Filed Mar. 14, 1963, Ser. No. 265,102
Claims priority, application Germany, Mar. 17, 1962,
L 41,312; Aug. 8, 1962, L 42,662
22 Claims. (Cl. 73—141)

The present invention relates to an arrangement for directing and measuring forces which are being transmitted between cooperating structural elements of vehicles and other types of machines which are subjected to variable loads. For example, the arrangement of my invention may be used for directing and measuring forces which are being transmitted by and to structural elements of aircraft, of land vehicles, of building elements and the like.

It is already known to install in land vehicles or in various types of aircraft special measuring gauges which determine the magnitude of loads, such as overall load, pay load or combustible load, and for determining the position of the center of gravity. Insofar as I am informed, such measuring devices are installed in a manner to provide readings at all times, i.e., they are constantly subjected to stresses and must be sufficiently rugged to withstand substantial stresses for extended periods of time. Consequently, such measuring devices cannot indicate comparatively small variations in load and, therefore, they are unsatisfactory in many types of aircraft wherein the determination of loads must be carried out with utmost precision. A measuring device which is constructed to withstand stresses during landing and/or while the aircraft rolls along the runway is hardly capable of indicating rather small changes in the overall weight or in the pay load of the aircraft.

Accordingly, it is an important object of the present invention to provide a force measuring and directing arrangement which embodies one or more precision measuring devices and which is constructed and assembled in such a way that its measuring devices are subjected to stresses and must transmit loads only at the time when a reading is required and that the measuring devices are subjected to no stresses whatever in normal operation.

Another object of the invention is to provide an arrangement of the just outlined characteristics wherein the forces whose magnitude must be measured at regular or irregular intervals may be directed into a plurality of paths with little loss in time so that detouring of such forces may be brought about as frequently as desired and in all stages of operation. For example, if the arrangement of my invention is embodied in a main load-supporting strut of the landing gear, it may be adjusted in a way to insure that one or more measuring devices which form a part thereof are not called upon to transmit forces at the time the aircraft is landing or while the aircraft taxies along the ground so that all such shocks and stresses which arise during landing or during taxiing cannot affect the more delicate parts of the measuring devices.

A further object of the invention is to provide an improved column or strut which may be used in various types of vehicles and in many other structures, and which embodies one or more arrangements of the above outlined characteristics.

A concomitant object of my invention is to provide a novel detouring or redirecting member which forms part of my improved arrangement and which may be used to direct forces through one or more measuring devices or to interrupt the transmission of forces to such devices.

With the above objects in view, one feature of my invention resides in the provision of an arrangement which is used for selectively directing forces into different paths and for measuring the magnitude of forces in at least one of such paths. The arrangement comprises a force-transmitting and a force-receiving structural element one of which comprises a measuring portion for determining the magnitude of forces transmitted to the other element, and a detouring member which is movable with respect to at least one of the two elements between a first position of adjustment in which it transmits forces between the measuring portion and the other element and a second position of adjustment in which it interrupts the transmission of forces between the measuring portion and the other element. The arrangement is preferably such that the element which comprises the measuring portion also comprises a second portion which is engaged by the detouring member when the latter is moved to its second position of adjustment. The measuring portion may comprise one or more precision finished gauge blocks which form part of precision gauges serving to furnish readings as to the magnitude of forces which are being transmitted between the structural elements.

The detouring member may assume the form of a rotary or axially movable body and may be shaped as a disk, as a composite structure including a pair of spaced disks, as a rotary tube, as an axially movable tube, or as an axially movable rod.

The novel features which are considered as characteristic of the invention are set forth in particular in the appended claims. The improved arrangement itself, however, both as to its construction and the method of assembling and operating the same, together with additional features and advantages thereof, will be best understood from the following detailed description of certain specific embodiments with reference to the accompanying drawings, in which:

FIG. 1 is a schematic partly elevational and partly sectional view of an arrangement which is embodied in the main load-supporting strut for the wheel of an aircraft and wherein the detouring member assumes a position in which it enables a pair of gauges to indicate the magnitude of forces to which the wheel is subjected;

FIG. 2 illustrates the upper portion of the structure shown in FIG. 1 with the detouring member in a different position in which it interrupts the flow of forces through and the transmission of loads to the gauges;

FIG. 3 is an enlarged perspective view of the detouring member;

FIG. 4 is a schematic partly elevational and partly sectional view of a slightly different force directing and measuring arrangement which is again embodied in a main load-supporting strut for the wheel of an aircraft and whose detouring member assumes the form of a specially configurated tubular body assuming a position of adjustment in which it directs forces to the blocks of two gauges which measure the magnitude of forces and indicate the loads that are being transmitted from the wheel to the fuselage or vice versa;

FIG. 5 illustrates the upper portion of the structure shown in FIG. 4 but with the detouring member in a different angular position in which it interrupts the transmission of loads to the gauges;

FIG. 6 is an enlarged perspective view of the detouring member which is used in the arrangement of FIGS. 4 and 5;

FIG. 7 is a schematic partly elevational and partly sectional view of a third force directing and measuring arrangement which is also embodied in a strut and whose detouring member is provided with a worm wheel and assumes an angular position in which it permits transmission of loads to a pair of differently mounted gauge blocks;

FIG. 8 illustrates the upper portion of the structure shown in FIG. 7 with the detouring member in a different angular position in which it prevents the transmission of loads to the gauge blocks;

FIG. 9 is an enlarged perspective view of the detouring member which is used in the arrangement of FIGS. 7 and 8;

FIG. 10 is a partly elevational and partly central vertical sectional view of a fourth arrangement which comprises four gauge blocks and a composite detouring member and wherein the gauge blocks form part of gauges which are used to measure radial forces and to determine the magnitude of loads which do not act in the axial direction of the structure in which the arrangement is installed;

FIG. 11 is a vertical section through a fifth force directing and measuring arrangement wherein the detouring member assumes the form of an axially movable tube and wherein this member is shown in a position in which it transmits loads to the block of a single measuring gauge;

FIG. 12 illustrates the structure of FIG. 11 and shows the detouring member in a different position in which it interrupts the transmission of loads to the gauge;

FIG. 13 is a vertical section through an additional arrangement wherein the detouring member assumes the form of a solid rod which is reciprocable with respect to a pair of structural elements and assumes a position in which it transmits loads to a single gauge block; and FIG. 14 illustrates the structure of FIG. 13 and shows the detouring member in a different axial position in which this member interrupts the transmission of loads to the gauge block.

Referring now in greater detail to the drawings, and first to FIGS. 1 and 2, there is shown an arrangement which is used for selectively directing forces into different paths and for measuring the magnitude of forces in one of such paths. This arrangement is embodied in the main load-supporting strut or column for an airplane wheel 1, and this strut comprises an upper structural element or leg 2 and a lower structural element or leg 3 which latter is reciprocable in a frame-like end portion or extension 4 of the element 2. A collar 5 on the element 3 is received in a complementary recess 6 of the extension 4 to restrict the elements 2, 3 to axial movements with respect to each other. When the wheel 1 comes into contact with the ground, the element 3 transmits forces to the element 2; on the other hand, when the aircraft is at a standstill, the upper element 2 transmits loads to the lower element 3. The means for transmitting forces between the elements 2 and 3 comprises a specially configurated detouring member 7 which is inserted between the flat upper face of the lower element 3 and the flat lower face or underside of the base of the extension 4. In accordance with my invention, this detouring member is movable between two positions of adjustment in one of which, namely, a force transmitting position of adjustment, it transmits forces from the upper element 2 to a first portion 3a, i.e. a fore transmitting portion, of the lower element or vice versa and in the other of which, namely, a measuring position of adjustment, it transmits forces between the element 2 and a measuring portion of the lower element 3. This measuring portion comprisese two measuring devices or gauges 8a, 8b (shown in FIG. 1) each of which includes a gauge block 9a, 9b (also called gaging member or anvil) and a conventional dial 10a, 10b, the latter serving as a means for indicating the extent of deformation (compression) of the respective gauge blocks and for thereby providing readings which are indicative of the magnitude of forces which are transmitted between the blocks 9a, 9b and the extension 4 of the element 2.

As shown in FIG. 3, the detouring member 7 assumes the form of a rotary disk or wheel which is provided with two pairs of axially extending segment-shaped projections or sections 11a, 11b. This disk is also formed with a ring of circumferentially arranged teeth forming a worm wheel 12 which mates with a worm 13 rotatably supported by the extension 4 and being driven by a suitable motor 14, shown in phantom lines. The parts 12–14 together constitute an adjusting means for the disk 7, and this disk is rotatable about a shaft 15 whose ends are respectively journaled in the extension 4 and in the upper portion 3a of the lower structural element 3 so that the disk is free to rotate about an axis which is parallel with the general direction of the paths in which the forces are transmitted between the elements 2 and 3. In FIG. 1, the motor 14 has operated the worm 13 to move the disk 7 into a first position of angular adjustment in which the projections 11a, 11b respectively engage the gauge blocks 9a, 9b and the extension 4 so that the upper element 2 transmits forces in a composite path passing through the extension 4, through the projections 11a, 11b through the gauge blocks 9a, 9b and through the lower part of the element 3, or vice versa. The blocks 9a, 9b are deformed to the extent determined by the magnitude of such forces and the respective dials 10a, 10b indicate the magnitude of the forces. If desired, the dials 10a, 10b may be installed in the pilot's cabin so that the pilot may observe the magnitude of forces whenever he decides to operate the motor 14 by remote control so as to move the disk 7 to the position of FIG. 1.

FIG. 2 illustrates the disk 7 in the other of its two positions in which the projections 11a, 11b bear directly against the upper portion 3a of the lower structural element 3 so that the forces are now transmitted in a different path passing from the lower part of the element 3, through the upper portion 3a, through the projections 11a, 11b, through the extension 4 and to the upper part of the element 2, or vice versa.

The exact construction of the gauges 8a, 8b forms no part of this invention. Such gauges are well known in the art and, if they utilize gauge blocks, normally comprise suitable mechanisms which amplify the deformation of the blocks so that the dials 10a, 10b may provide readily observable readings to indicate the magnitude of forces which cause deformation of the blocks. As shown, the blocks are recessed into the lower structural element 3 so that their upper end faces are normally flush with the upper end face of the portion 3a.

The disk 7 normally assumes the position of FIG. 2 and is moved to the position of FIG. 1 only at such times when it becomes necessary to determine the magnitude of forces, for example, for determining the pay load, combustible load, useful load or full load of the aircraft, for determining the position of the center of gravity which may be calculated once one obtains readings from gauges which are mounted on all main struts of the landing gear, for determining any unevenness in the distribution of load, for determining the magnitude of stresses during landing (ground loads) or during taxiing, and for many other purposes.

The blocks 9a, 9b constitute but one form of gaging members which may be used in the arrangement of my invention. The expressions gaging members, gauge blocks or anvils will be used here to denote such parts of gauges which are accurately finished to size and are employed for undergoing deformation which is then measured by the gauges to provide readings indicative of the forces acting between a force-transmitting and a force-receiving structural element. The deformation of gauge blocks 9a, 9b may be measured vertically (compression or shortening) or horizontally (expansion), as viewed in FIGS. 1 and 2. For example, if the blocks are of cylindrical shape, the dials 10a, 10b may be calibrated to indicate shortening of the blocks or any increases in the diameters of the blocks.

It goes without saying that a single gauge may be sufficient in certain types of arrangements, for example, in overland vehicles wherein the gauge will be subjected to lesser stresses than during landing of an aircraft.

Furthermore, it is possible to use a detouring disk with three or more pairs of projections, depending on the number of gauge blocks.

FIGS. 4 and 5 illustrate a somewhat different arrangement which is again embodied in the main load-supporting strut for an airplane wheel 101. The lower structural element 103 is practically identical with the element 3 and cooperates with a slightly modified upper structural element 102 whose lower end portion or extension 104 is bifurcated and supports the trunnions 115a, 115b of a shaft 115 for a tubular detouring member 107 which is shown in more detail in FIG. 6 and which may be rotated by a suitable adjusting means 114 serving to move this detouring member between the positions of FIGS. 4 and 5. The lower structural element 103 of the strut again comprises an upper end portion 103a and a measuring portion which includes two diametrically oppositely arranged spaced gauge blocks or gaging members 109a, 109b. These blocks form part of non-illustrated gauges which are analogous to those shown in FIG. 1.

FIG. 6 illustrates that the detouring member 107 comprises two spaced radially extending annular projections or rings 111a, 111b which are integral with the ends of a trough-shaped connecting web 111c, and this connecting web comprises a further radially extending projection in the form of an elongated rib 111d. The trunnions 115a, 115b constitute the end portions of the shaft 115 (not shown in FIG. 6) which may be inserted through the projections 111a, 111b and across a recess or gap 111e which extends between the projections 111a, 111b and is coextensive with the projection 111d. A substantially C-shaped bearing sleeve 116 of elastically deformable synthetic plastic material surrounds the shaft 115 in the recess 111e. The purpose of this sleeve is to eliminate play between the elements 102, 103 and to protect these elements against excessive shocks.

The arrangement of FIGS. 4 and 5 operates as follows:

When the adjusting means 114 moves the shaft 115 to the angular position of FIG. 4, the shaft rotates the detouring member 107 whereby the projections 111a, 111b respectively abut against the upper end faces of the blocks 109a, 109b so that the path of forces is defined by the lower part of the element 103, by the blocks 109a, 109b, by the projections 111a, 111b, by the trunnions 115a, 115b, by the extension 104 and by the upper part of the element 102, or vice versa. The rib 111d is spaced from the upper portion 103a of the lower element 103 so that this upper portion is not under load.

When the adjusting means 114 moves the shaft 115 and the member 107 to the position of FIG. 5, the rib 111d engages the upper portion 103a of the element 103 and the projections 111a, 111b are spaced from the blocks 109a, 109b. Thus, the gauges are idle and the flow of forces takes place through the upper portion 103a, through the detouring member 107 and through shaft 115 to the extension 104, or vice versa. The main difference between the arrangements of FIGS. 1-2 and 4-5 is that the latter comprises a detouring member 107 which is rotatable about a horizontal axis, i.e., about an axis which is perpendicular to the direction of forces. As a rule, the member 107 will normally assume the position of FIG. 4 and its projections 111a, 111b will engage the blocks 109a, 109b only at such times when it becomes necessary to measure the forces which are being transmitted from the element 102 to the element 103 or vice versa.

The upper portion 103a of the element 103 terminates at its upper end in a cylinder which accommodates the central portion of the shaft 115, the bearing sleeve 116 and the connecting web 111c with the rib 111d.

In the arrangement of FIGS. 7 and 8, the wheel 201 is mounted at the lower end of a main load-supporting strut which comprises a lower structural element 203 and an upper structural element 202, the latter having at its lower end a bifurcated end portion or extension 204 which defines a pair of aligned openings for a detouring member 207 of the type shown in FIG. 9. This member comprises a trough-shaped web 211c whose ends are integral with ring-like radial projections 211a, 211b and which is provided with a rib-like radial projection 211d. In addition, the member 207 comprises a centrally located cylindrical section 211f which is respectively separated from the projections 211a, 211b by a pair of recesses or gaps 211e, 211e'. The cylindrical section 111f is formed with a worm wheel 212 which mates with a worm 213 mounted in the upper structural element 202 and driven by a suitable motor, not shown, in order to move the detouring member 207 from the angular position of FIG. 7 to that of FIG. 8 or vice versa.

In contrast to the construction of the previously described arrangements, the gauge blocks 209a, 209b are mounted in the upper structural element 202 and are engaged by the projections 211a, 211b when the member 207 assumes the position of FIG. 7. This member is reinforced by a shaft 215 which extends through the projections 211a, 211b and through the cylindrical section 211f to support a pair of spaced bearing sleeves 216a, 216b which correspond to and perform the same function as the sleeve 116. It will be noted that the sleeves 216a, 216b are respectively accommodated in the recesses 211e, 211e'.

When the measurement is completed, the worm 213 is rotated to turn the wheel 212 and to move the detouring member 207 to the position of FIG. 8 so that the projections 211a, 211b are spaced from the respective blocks 209a, 209b and that the rib 211d of the web 211c abuts directly against the upper portion 203a of the lower structural element. The path of forces is now defined by the extension 204, by the web 211c, by the cylindrical section 211f of the detouring member 207 and by the upper portion 203a, or vice versa. The upper portion 203a is provided with a cutout so that it does not abut against the teeth of the worm wheel 212.

The main difference between the arrangements of FIGS. 4, 5 and 7, 8 is that the shaft 215 does not engage directly with the extension 204 and that the gauge blocks 209a, 209b are mounted in the upper element 202 of the strut.

FIG. 10 illustrates an arrangement which is utilized for transmitting and for measuring forces acting at right angles to the axis of the one or the other structural element. In this embodiment of my invention, a rod-like lower structural element 303 is coupled with an upper structural element 302 by means of a universal joint including a ball 320 and a socket 321 which latter is provided in the element 302. The ball 320 is rigid with a threaded stem 322 which is screwed into an axial bore formed in the conical upper end portion 303b of the lower element 303. The element 303 comprises an annular flange 304 which corresponds to the extension 204 and which is accommodated with axial and radial play in a cylindrical chamber 323 of the element 302. This chamber receives a composite detouring member which includes an upper disk 307a and a lower disk 307b, and each of these disks is formed with a pair of substantially segment-shaped axially extending projections 311a, 311b. The disks 307a, 307b are rigidly secured to the element 303 and the latter is rotatable with respect to the element 302 or vice versa. It will be noted that the element 302 accommodates two pairs of gauge blocks 309a, 309a' and 309b, 309b' which are respectively adjacent to the upper and to the lower axial end of the chamber 323. The lower end portion of the element 302 comprises two sections 302a, 302b which are respectively adjacent to the exposed sides of the disks 307a, 307b and whose end faces are respectively flush with the exposed end faces of the blocks 309a, 309a' and 309b, 309b'.

When the element 303 assumes the angular position of FIG. 10 and is subjected to the action of forces acting in the direction indicated by an arrow X, the ball 320 tends to turn in its socket 321 and the flange 304 compels the upper projection 311a to bear against the block 309a so that the gauge of which this block forms a component part will indicate the magnitude of such forces.

On the other hand, when the element 303 is subjected to radial stresses acting in a direction indicated by the arrow Y, the flange 304 compels the lower projection 311b to bear against the end face of the block 309b so that the corresponding gauge will indicate the magnitude of such stresses if the scale of its dial is properly calibrated so that deformation (compression) of the block 309b is proportional with the magnitude of stresses acting in the direction of the arrow Y.

If the user desired to terminate the measurement, the element 302 is rotated through about 90 degrees so that the projections 311a, 311b respectively abut against the sections 302a, 302b of the element 302 and that the blocks 309a, 309b are not subjected to any compressive stresses. If the element 303 is again rotated through 90 degrees, the projections 311a, 311b are aligned with the blocks 309a', 309b' and the corresponding gauges will indicate the magnitude of forces which tend to move the elements 302, 303 out of axial alignment with each other. All axial forces are transmitted through the joint 320, 321 which may be replaced by a Cardanic joint or by any other suitable universal joint.

Of course, the disks 307a, 307b may be provided with additional projections which abut against the blocks 309a', 309b' when the projections 311a, 311b abut against the blocks 309a, 309b. It is also possible to provide four additional gauge blocks so that the gauge blocks are arranged in two groups in each of which the gauge blocks are angularly displaced through 90 degrees with respect to each other. In such instances, the arrangement of my invention can indicate simultaneously stresses in four different radial directions of the element 302 or 303. Of course, the disks 307a, 307b are then provided with additional projections whose distribution is such that they may simultaneously engage the gauge blocks or that all of them may be moved out of registry with the blocks.

The joint 320, 321 permits the element 302 to swivel with respect to the element 303 and vice versa but prevents axial movements of these elements with respect to each other. The diameters of coaxial bores 326, 327 in the lower end portion of the element 302 are such that the walls of these bores cannot come into abutment with the lower part of the element 303 or with the conical end portion 303b. It will be understood that the element 303 consists of two or more separable components in order to permit insertion of the parts 304, 307a, 307b, 309a, 309b, 309a', 309b' into the chamber 323.

The main difference between the arrangement of FIG. 10 and the previously described arrangements is that the gauge blocks 309a–309b' may be used to measure forces whose direction varies and that these blocks may measure forces which are not active in the axial direction of the cooperating elements.

Referring to FIGS. 11 and 12, there is shown an arrangement which comprises an axially movable detouring member 407. This member assumes the form of a cylinder which is mounted on a shaft 415 and which is reciprocable with or relative to this shaft so as to move its semicylindrical projection 411 into or out of abutment with a single gauge block 409. The member 407 is rotatable in the bifurcated extension or end portion 404 of the upper structural element 402 and extends through a horizontal bore provided in the upper end portion 403a of the lower structural element 403. The upper end portion 403a accommodates the block 409 and is directly engaged by the projection 411 of the member 407 when the latter assumes the position of FIG. 12, in FIG. 11, the projection 411 engages the upper end face of the block 409 so that the cooperating gauge (not shown) indicates the magnitude of forces which are being transmitted by the element 402 to the element 403 or vice versa. It will be noted that one of the annular end portions 411f, 411f' of the member 407 also abuts against the portion 403a of the element 403 when the block 409 does not transmit loads. Thus, if the member 407 is shifted in a direction to the right, as viewed in FIG. 11, the end portion 403a will be engaged by the projection 411 and by the annular portion 411f'.

The length of the recesses or gaps 411e, 411e' between the annular portions 411f, 411f' and the projection 411 at least equals but preferably exceeds the diameter of the block 409.

Referring finally to FIGS. 13 and 14, there is shown an additional force directing and measuring arrangement which comprises a bolt- or rod-shaped solid detouring member 507 serving to connect a lower structural element 503 with the bifurcated extension or end portion 504 at the lower end of an upper structural element 502. The member 507 comprises a projection which assumes the form of an annular collar 511 and which is separated from the cylindrical portions 511f, 511f' by a pair of annular recesses or gaps 511e, 511e'. In the axial position of FIG. 13, the projection 511 abuts against a single gauge block 509 which is recessed into the element 503 so that the cooperating gauge indicates the magnitude of forces which are being transmitted by the element 503 to the element 502 or vice versa. On the other hand, when the member 507 is moved to the axial position of FIG. 14, the projection 511 abuts against the end portion 503a of the lower element 503 so that the gauge of which the block 509 forms a component part is idle and that the forces are transmitted from the portion 503a to the member 507 and to the extension 504 or vice versa. An important advantage of this ararngement is its simplicity because the detouring member 507 may be shifted by hand or by a very simple adjusting device.

The axial length of the recesses 511e, 511e' at least equals but preferably exceeds the diameter of the block 509 to make sure that this block is not subjected to compressive stresses when the member 507 assumes the position of FIG. 14. It is equally possible to move the member 507 in a direction to the right, as viewed in FIG. 13, so as to move the recess 511e' above the exposed end face of the block 509. The recesses 511e, 511e' need not be of annular shape since the member 507 must not rotate in the extension 504.

While I believe that the improved arrangement will find an important and highly advantageous use in the landing gear of aircraft, I also contemplate utilizing such arrangements on land vehicles, for example, in trucks, bulldozers and other heavy-duty conveyances. When the arrangement is used in the main load-supporting struts of aircraft, the detouring members preferably assume such positions as are shown in FIGS. 2, 5, 8, 12 or 14 so as to avoid damage to the sensitive elements of the gauges unless, of course, the pilot desires to measure the magnitude of forces which arise during landing or while the aircraft travels along the runway.

Two or more arrangements of the type shown in FIGS. 1–14 may be embodied in a single strut if desired and necessary. For example, the arrangement of FIG. 10 may be combined with that of FIGS. 1–2 so that the magnitude of radial forces may be determined simultaneously with the magnitude of axial forces.

Suitable slide bearings or roller bearings are provided to facilitate rotation or axial movements of the detouring member. For example, FIG. 3 shows the outer race 15d of a roller bearing which reduces friction between the disk 7 and the shaft 15.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An arrangement for selectively directing forces into different paths and for measuring the magnitude of forces in at least one of such paths, particularly for measuring forces transmitted between two structural elements of a vehicle, comprising a force-transmitting first structural element and a force-receiving second structural element, said elements having adjacent end portions located at a fixed distance from each other; measuring means comprising a pair of spaced gaging members operatively connected with one of said elements; and a rotary cylindrical detouring member disposed between the end portions of said elements and comprising two spaced radially extending projections and a third radially extending projection which is angularly spaced from said two projections, said detouring member being movable between a first position of angular adjustment in which each of said two projections engages one of said gaging members and said detouring member also engages the end portion of the other of said elements so that transmission of forces between said elements occurs through said gaging members and the measuring means indicates the magnitude of such forces, and a second position of angular adjustment in which said detouring member engages the end portion of the other element and in which said third projection engages the end portion of the one element whereas the first mentioned projections are out of force-transmitting engagement with said gaging members, said detouring member being movable between said first and second positions thereof without change of distance between said structural elements.

2. An arrangement as set forth in claim 1, wherein said detouring member is provided with recess means intermediate said two projections and wherein said third projection is coextensive with said recess means.

3. An arrangement for selectively directing forces into different paths and for measuring the magnitude of forces in at least one of such paths, particularly for measuring forces transmitted between two structural elements of a vehicle, comprising a force-transmitting first structural element and a force-receiving second structural element, said elements having adjacent end portions located at a fixed distance from each other; a measuring device comprising a gaging member operatively connected with the end portion of one of said elements; and an axially movable tubular detouring member disposed between said end portions and comprising an annular projection and a recess adjacent to said projection, said detouring member being movable with respect to said elements between a first position of axial adjustment in which said projection engages said gaging member so that the detouring member transmits forces between said gaging member and the end portion of the other of said elements, and a second position of axial adjustment in which said projection engages the end portion of said one element so that the detouring element transmits forces between said end portions, said recess being adjacent to said gaging member when the detouring member assumes said second position.

4. An arrangement for selectively directing forces into different paths and for measuring the magnitude of forces in at least one of such paths, particularly for measuring forces transmitted between two structural elements of a vehicle, comprising a force-transmitting first structural element and a force-receiving second structural element, said elements having adjacent end portions located at a fixed distance from each other; a measuring device comprising a gaging member operatively connected with the end portion of one of said elements; and an axially movable tubular detouring member disposed between said end portions and comprising a pair of spaced recesses and an annular projection intermediate said recesses, said detouring member being movable with respect to said elements between a first position of axial adjustment in which said projection engages said gaging member so that the detouring member transmits forces between said gaging member and the end portion of the other of said elements, and a second position of axial adjustment in which said projection engages the end portion of said one element so that the detouring element transmits forces between said end portions, one of said recesses being adjacent to said gaging member when the detouring member assumes said second position.

5. An arrangement for selectively directing forces into different paths and for measuring the magnitude of forces in at least one of such paths, particularly for measuring forces transmitted between two structural elements of a vehicle, comprising a force-transmitting first structural element and a force-receiving second structural element, said elements having adjacent end portions located at a fixed distance from each other; a measuring device comprising a gaging member operatively connected with the end portion of one of said elements; and an axially movable solid rod-shaped detouring member disposed between said end portions and comprising a pair of spaced recesses and an annular projection between said recesses, said detouring member being movable with respect to said elements between a first position of axial adjustment in which said projection engages said gaging member so that the detouring member transmits forces between said gaging member and the end portion of the other of said elements, and a second position of axial adjustment in which said projection engages the end portion of said one element so that the detouring element transmits forces between said portions, one of said recesses being adjacent to said gaging member when the detouring member assumes said second position.

6. An arrangement for selectively directing forces into different paths and for measuring the magnitude of forces in at least one of such paths, particularly for measuring forces transmitted between two structural elements of a vehicle, comprising a force-transmitting first structural element and a force-receiving second structural element, one of said elements having an internal chamber and the other thereof having a portion received in said chamber; joint means connecting said elements so that they are adapted to swivel with respect to each other; a measuring device comprising a gaging member mounted in said one element adjacent to said chamber; and a detouring member rigid with said other element and received in said chamber, said elements being angularly movable with respect to each other so that said detouring member may be moved into a first position of angular adjustment in which it abuts against and transmits forces between said other element and said gaging member and into a second position of angular adjustment in which it transmits forces directly between said elements so that the gaging member is not subjected to any stresses.

7. An arrangement as set forth in claim 6, wherein said other element comprises an annular flange received in said chamber and wherein said detouring member comprises two disks disposed at the opposite sides of said flange and each having at least one axial projection, there being at least one gaging member for each of said disks so that the projections of said disks may be moved into and out of force-transmitting engagement with the respective gaging members in response to swiveling movements of said elements with respect to each other.

8. An arrangement for selectively directing forces into different paths and for measuring the magnitude of forces in at least one of such paths, particularly for measuring forces transmitted between two structural elements of a vehicle, comprising a force-transmiting first structural element and a force-receiving second structural element, one of said elements having an internal chamber and the other thereof having a portion received in said chamber; a ball and socket joint connecting said elements so that they are adapted to swivel with respect to each other; a measuring device comprising a gaging member mounted in said one element adjacent to said chamber; and a detouring member rigid with said other element and received in said chamber, said elements being angularly movable with respect to each other so that said detouring member may be moved into a first position of angular adjustment in which it abuts against and transmits forces between said other element and said gaging member and into a second position of angular adjustment in which it transmits forces directly between said elements so that the gaging member is not subjected to any stresses.

9. An arrangement for selectively directing forces into different paths and for measuring the magnitude of forces in at least one of such paths, particularly for measuring forces transmitted between two structural elements of a vehicle, comprising a force-transmitting first structural element and a force-receiving second structural element, one of said elements having an internal chamber and open-ended bore means communicating with said chamber, the other of said elements extending through said bore means and having a portion received in said chamber; joint means connecting said portion of said other element with said one element so that they are adapted to swivel with respect to each other; a measuring device comprising a gaging member mounted in said one element adjacent to said chamber; and a detouring member rigid with said other element and received in said chamber, said elements being angularly movable with respect to each other so that said detouring member may be moved into a first position of angular adjustment in which it abuts against and transmits forces between said other element and said gaging member and into a second position of angular adjustment in which it transmits forces directly between said elements so that the gaging member is not subjected to any stresses.

10. An arrangement for selectively directing forces into different paths and for measuring the magnitude of forces in at least one of such paths, particularly for measuring forces transmitted between two structural elements of a vehicle, comprising a first structural element and a second structural element located at a fixed distance from said first element, said first element having a force transmitting portion and a measuring portion located at said fixed distance from said force transmitting and measuring portions, respectively, of said first element and said second element having a first and a second force transmitting portion; and a detouring member movably arranged between said first and second structural elements and having a force transmitting portion having opposite faces located at said fixed distance; and means for moving said detouring member between a measuring position of adjustment in which said force transmitting portion thereof is located between said measuring portion of said first element and said first force transmitting portion of said second element and not located between said force transmitting portion of said first element and said second force transmitting portion of said second element and a force transmitting position of adjustment in which said force transmitting portion of said detouring member is located between said force transmitting portion of said first element and said second force transmitting portion of said second element and not located between said measuring portion of said first element and said first force transmitting portion of said second element, whereby said detouring member may be moved between said measuring and force transmitting positions thereof without movement of said structural elements out of said fixed distance relationship with one another.

11. An arrangement as set forth in claim 10, wherein said detouring member is disk-shaped and rotatable about its own axis between said measuring and said force transmitting positions of adjustment therof.

12. An arrangement as set forth in claim 10, wherein said measuring portion of said first element comprises a gaging member, said detouring member being disk-shaped and rotatable about its own axis between said measuring and said force transmitting positions of adjustment thereof, and said detouring member comprising a projection engaging said gaging member when said detouring member is in said measuring position of adjustment thereof.

13. An arrangement as set forth in claim 12, further comprising a shaft having end portions journaled in said elements, said rotary disk-shaped detouring member being mounted on said shaft between said elements.

14. An arrangement as set forth in claim 10, further comprising bearing means provided on said second element for movably supporting said detouring member.

15. An arrangement as set forth in claim 14, wherein said bearing means are arranged to support said detouring member for translatory movement.

16. An arrangement as set forth in claim 14, wherein said bearing means are arranged to support said detouring member for rotational movement.

17. An arrangement for selectively directing forces into different paths and for measuring the magnitude of forces in at least one of such paths particularly for measuring forces transmitted between two structural elements of a vehicle comprising a first structural element and a second structural element located at a fixed distance from each other, said first element having a force transmitting surface portion and a measuring surface portion and said second element having a force transmitting surface only, and a detouring member movably arranged between said first and second structural elements and having a measuring portion having force transmitting faces located at a distance equal to the distance between said measuring surface portion of said first element and said force transmitting surface of said second element and a force transmitting portion having force transmitting faces located at a distance equal to the distance between said force transmitting surface portion of said first element and said force transmitting surface of said second element; and means for moving said detouring member between a measuring position of adjustment in which said measuring portion thereof is located between said measuring surface portion of said first element and said force transmitting surface of said second element and said force transmitting portion of said detouring member is not located between said force transmitting surface portion of said first element and said force transmitting surface of said second element and a force transmitting position of adjustment in which said force transmitting portion of said detouring member is located between said force transmitting surface portion of said first element and said force transmitting surface of said second element and said measuring portion of said detouring member is not located between said measuring surface portion of said first element and said force transmitting surface of said second element whereby said detouring member may be moved between said measuring and force transmitting positions thereof without movement of said structural elements out of said fixed distance relationship with one another.

18. An arrangement as set forth in claim 17, wherein said detouring member is tubular and movable axially between said measuring and force transmitting positions thereof.

19. An arrangement as set forth in claim 17, wherein said detouring member is rod-shaped and is movable axially between said measuring and force transmitting positions thereof.

20. An arrangement as set forth in claim 17, wherein said detouring member is tubular and rotatable about its own axis between said measuring and said force transmitting positions thereof.

21. An arrangement as set forth in claim 20, wherein said rotary tubular detouring member comprises a first and an angularly spaced second projection, said first and said second projections constituting, respectively, said measuring portion and said force transmitting portion of said detouring member.

22. An arrangement for selectively directing forces into different paths and for measuring the magnitude of forces in at least one of such paths particularly for measuring forces transmitted between two structural elements of a vehicle comprising a first structural element and a second structural element located at a fixed distance from each other, said first element having a force transmitting surface portion and a measuring surface portion and said second element having a force transmitting surface, the distance between said force transmitting surface of said second element and said force transmitting surface portion of said first element being equal to the distance between said force transmitting surface of said second element and said measuring surface portion of said first element; and a detouring member having a width equal to the distance between said force transmitting portion of said second element and said portions of said first element; and means for moving said detouring member between a measuring position of adjustment in which it is located solely between said measuring surface portion of said first element and a force transmitting surface of said second element and a force transmitting position in which it is located solely between said force transmitting surface portion of said first element and said force transmitting surface of said second element whereby said detouring member may be moved between said measuring and force transmitting positions thereof without change of distance between said structural elements.

References Cited by the Examiner

UNITED STATES PATENTS

| | | | |
|---|---|---|---|
| 809,324 | 1/1906 | Prendergast | 177—151 |
| 1,133,901 | 3/1915 | Winslow | 177—151 |
| 2,746,738 | 5/1956 | Reiser | 177—134 X |

RICHARD C. QUEISSER, *Primary Examiner.*

DAVID SCHONBERG, L. MOK, G. M. GRON,
*Assistant Examiners.*